United States Patent [19]
Sakaida et al.

[11] Patent Number: 5,196,151
[45] Date of Patent: Mar. 23, 1993

[54] METHOD FOR PRODUCING FOAM BASE MATERIAL PRODUCT WITH SECURING DEVICE

[75] Inventors: Shoji Sakaida; Keizo Ito; Takashi Kato; Hikaru Andoh, all of Inazawa, Japan

[73] Assignee: Toyoda Gosei Co., Ltd., Nishikasugai, Japan

[21] Appl. No.: 756,620

[22] Filed: Sep. 10, 1991

[30] Foreign Application Priority Data

Sep. 11, 1990 [JP] Japan .................. 2-241880

[51] Int. Cl.⁵ .................. B29C 67/22; B32B 31/00
[52] U.S. Cl. .................. 264/46.7; 264/46.4; 264/321; 264/511; 156/196; 156/298
[58] Field of Search .............. 156/92, 196, 298, 303.1; 428/316.6; 264/321, 46.7, 46.4, 511

[56] References Cited

U.S. PATENT DOCUMENTS

| | | | |
|---|---|---|---|
| 3,081,077 | 3/1963 | Sudman | 156/298 |
| 3,650,878 | 3/1972 | Mattsson et al. | 428/316.6 |
| 4,088,718 | 5/1978 | Mulvany, Jr. | 264/25 |
| 4,101,617 | 7/1978 | Friederich | 264/93 |
| 4,128,683 | 12/1978 | Nomura et al. | 156/322 |
| 4,663,210 | 5/1978 | Schreiber et al. | 264/321 |
| 4,873,045 | 10/1989 | Fujita et al. | 264/259 |
| 4,923,542 | 5/1990 | Janicki et al. | 156/92 |
| 4,968,474 | 11/1990 | Ito | 264/513 |
| 4,996,090 | 2/1991 | Steinke et al. | 428/316.6 |
| 5,041,319 | 8/1991 | Becker et al. | 428/316.6 |

FOREIGN PATENT DOCUMENTS

| | | | |
|---|---|---|---|
| 50-038647 | 12/1975 | Japan | 156/303.1 |
| 58-173630 | 10/1983 | Japan | 264/46.7 |
| 61-100418 | 5/1986 | Japan | . |

*Primary Examiner*—Allan R. Kuhns
*Attorney, Agent, or Firm*—Cushman, Darby & Cushman

[57] ABSTRACT

A method for producing a foam base material product composed of a composite sheet having a surface layer and a foam base layer with a securing device fixed on the form base layer. The method includes the steps of preparing an insert part with the securing device integrally fixed thereto, the insert part being made of a beads foam derived from a resin, placing the insert part within a mold, placing the foam base material layer of the hot molten composite sheet on the mold so that it faces the insert part, and closing the mold whereby the composite sheet is formed and the composite sheet is integrally heat fused with the insert part. This method produces a foam base material product that is more durable and easier to assemble with an auto body than is the prior art.

8 Claims, 7 Drawing Sheets

METHOD FOR PRODUCING FOAM BASE MATERIAL PRODUCT WITH SECURING DEVICE

BACKGROUND OF THE INVENTION

1. Field of the Invention

The present invention relates to a method of producing a foam base material product with a securing device for providing superior and simple assembly.

2. Description of the Related Art

Reference is made to U.S. Pat. Nos. 4,101,617, 4,873,045 and 4,968,474 as related art.

As shown in FIGS. 9 and 10, an instrument panel 8 has a complicated shape that requires many different steps to manufacture. For this, the panel 8 is formed from a composite sheet 80 consisting of a surface layer 81 and a foam base layer 82. The panel 8 is fixed to an auto body with a securing device 7 such as a clip, boss, bolt, etc.

Prior to fixing the above securing device 7 to the back surface of the panel, i.e., to foam base layer 82, a securing device seat 71 is bonded to the foam base layer 82 through vibration deposition, hot-melt, etc. Then an engagement piece 712 of a clip 72 is engaged with an engagement recess 711 of the seat 71.

When fixing the panel 8 to the auto body, a top end protrusion 722 of the clip 72 is engaged with a securing recess provided in the auto body.

The aforementioned instrument panel, however, has the following problem. Since the securing device 7 is bonded using a bond means such as vibration deposition, adhesion, etc., the bonding position is likely to be inconsistent, resulting in troublesome operation and poor assembly.

Fixing the panel 8 to the body deteriorates the accuracy of assembly. The bonded securing device 7 is likely to be damaged by shock due to insufficient strength of the bond. Further, assembly of panel 8 to the auto body requires a long time period to complete.

It is desirable that the securing device 7 can be directly fixed to the back of the instrument panel 8, i.e., foam base layer 82. The securing device 7, however, cannot be directly deposition bonded to the base layer 82 by adhesion.

SUMMARY OF THE INVENTION

It is an object of the present invention to provide a method for producing a foam base material product with a securing device that has high rigidity, as well as having superior and simpler assembly procedures associated therewith.

The present invention includes a method for producing a foam base material product composed of a composite sheet having a surface layer and a foam base layer with a securing device fixed to the foam base layer. The method according to the present invention includes the steps of preparing an insert part with the securing device integrally fixed to foam beads derived from resin, placing the insert part within a mold, placing the foam base layer of hot molten composite sheet on the mold facing the insert part, and closing the mold whereby the composite sheet is formed, and the composite sheet is integrally heat fused with the insert part.

Other objects, features and advantages of the present invention will become apparent upon consideration of the following description and the appended claims, with reference to the accompanying drawings, all of which form a part of this specification.

BRIEF DESCRIPTION OF THE DRAWINGS

The following is a description of the attached drawings, wherein like reference numerals designate corresponding parts.

FIG. 1 is a cross sectional view of the foam base material product;

FIG. 2 depicts a cross sectional view of an insert part used in the foam base material product;

FIG. 3 illustrates a cross sectional view of a heater for heating the composite sheet; and FIG. 4 shows a cross section of a mold wherein the insert part and the composite sheet are placed.

FIG. 5 is a perspective view of the securing device; and

FIG. 6 is a perspective view of the insert part;

FIG. 7 is a perspective view of the securing device; and

FIG. 8 is a perspective view of the foam beads product.

DETAILED DESCRIPTION OF THE PRESENTLY PREFERRED EXEMPLARY EMBODIMENT

The most important feature of this invention is characterized in that the securing device is integrally fixed to foam beads forming an insert part to be placed within a mold for forming an instrument panel for an automotive vehicle. In the mold, a hot molten composite sheet is formed as well, the composite sheet being integrally fused with the insert part.

The composite sheet may be formed of laminated sheet material consisting of a surface layer of, for example, polyvinyl chloride (hereinafter referred to as PVC) resin or polypropylene resin, and a foam base layer of polypropylene (hereinafter referred to as PP) resin or PVC resin. The surface layer may be composed of the skin of PVC and surface skin of PP foam, so as to provide a soft feel.

The foam beads is a foam structure derived from foaming and expanding resin beads, for example, by heating. Such foam beads may be obtained by foaming and expanding, for example, PP beads or polyethylene beads having particle sizes of about 1 mm and expanding the beads to 7-20 times that size.

Figure 2:
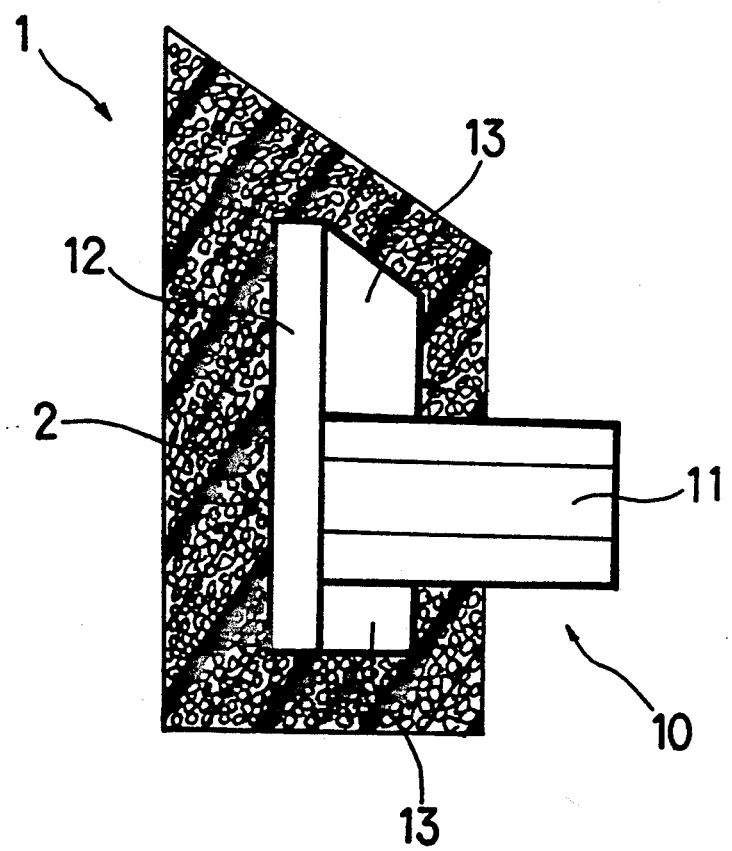
Figure 6:
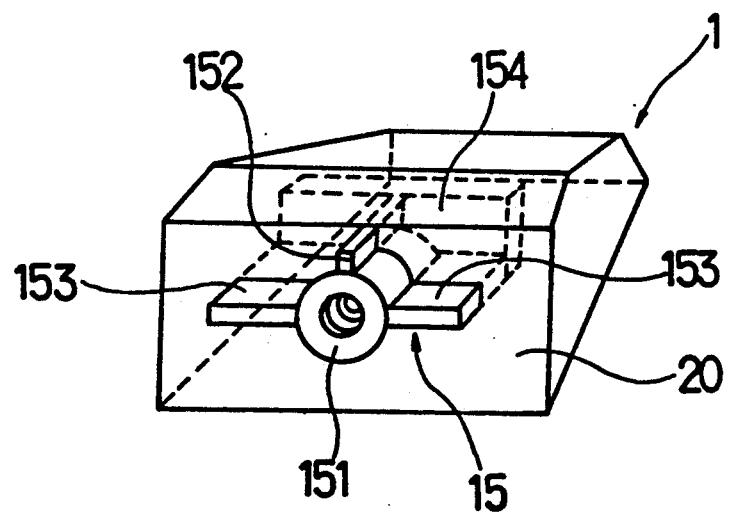
Figure 7:
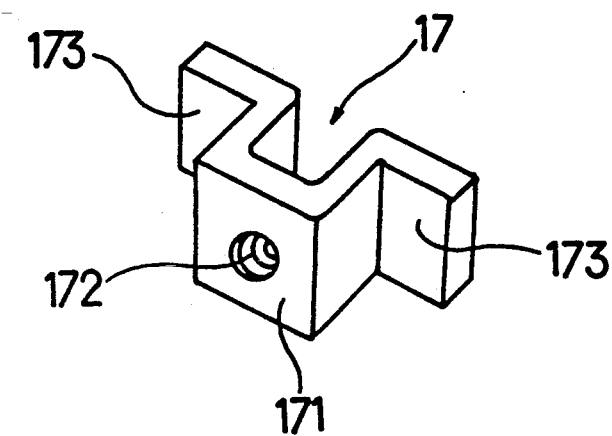
FIGS. 7 and 8 show Example 3 of this invention.
Figure 8:
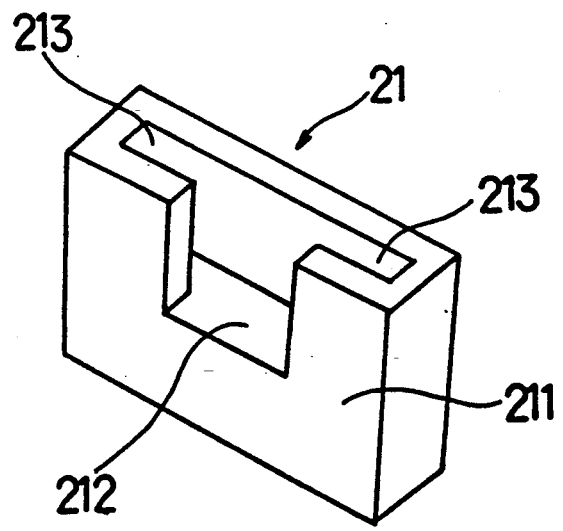
Figure 9:
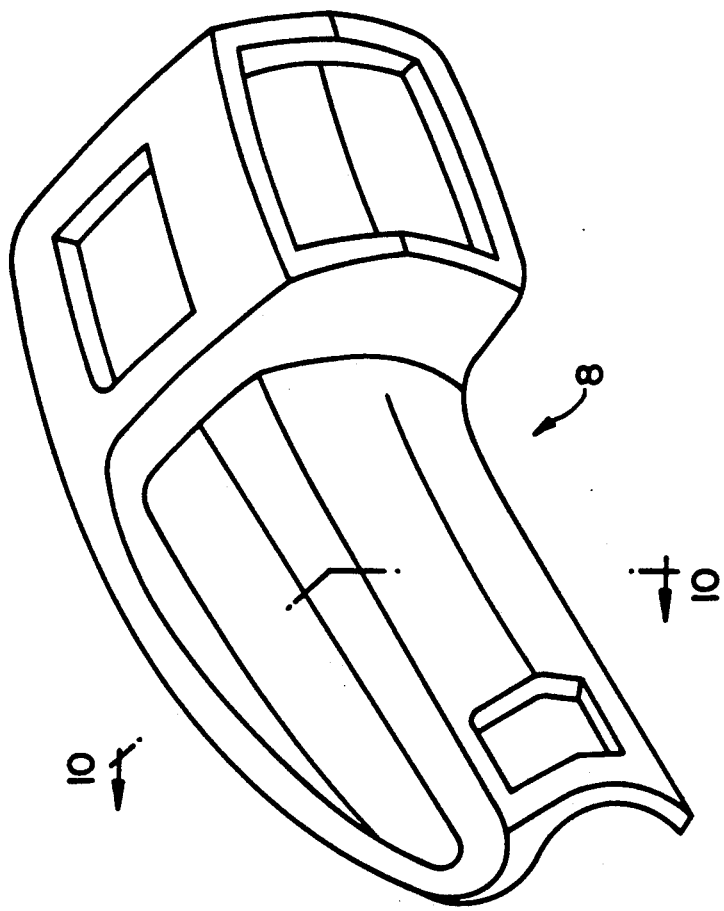
FIG. 9 is a perspective view of a prior instrument panel.
Figure 10:
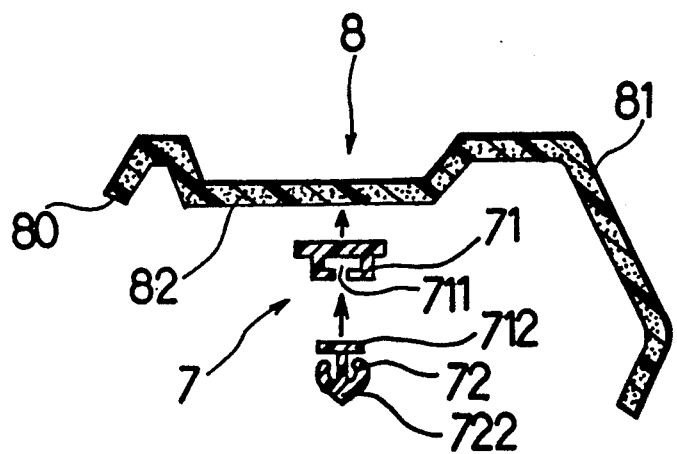
FIG. 10 is a cross section along line 10—10 of FIG. 9.

The insert part is constructed by integrally fixing the securing device to the foam beads. Such an insert part may be made by integrally fixing the securing device to the foam beads as shown in FIGS. 2 and 6, or by engaging or assembling the securing device with the molded product as shown in FIGS. 7 and 8.

Figure 4:
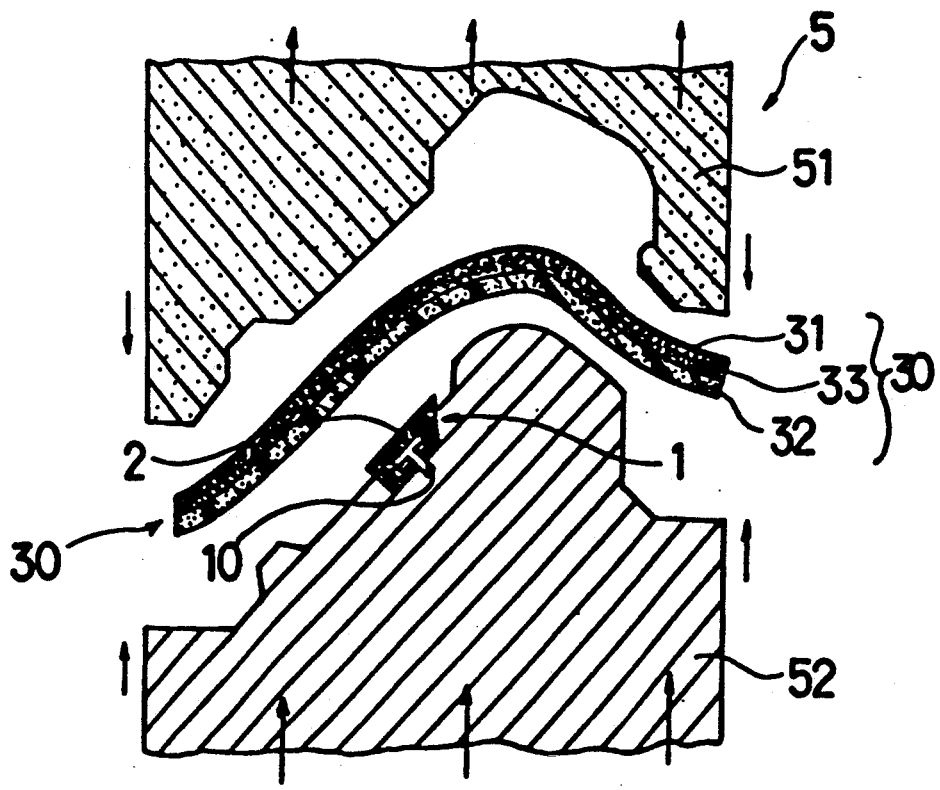

The hot molten composite sheet is placed within the mold, as shown in FIG. 4, so that its foam base layer and insert part is positioned towards the lower section of the mold. In this step, the foam base layer of the composite sheet and the surface layer of the insert part are heat fused.

Because the insert part has the securing device integrally fixed to foam beads, no bond means, such as vibration deposition, adhesion and the like, is necessary to fix the securing device to the foam base.

The foam base layer of hot molten composite sheet is placed so that it faces the insert part so that the sheet and the insert part are integrally fused together by heat, resulting in consistent positioning of the insert part for assembly to an auto body.

This invention, therefore, provides higher accuracy in assembling the securing device with the foam base product, and allows for simple assembly of the panel to the auto body. Since the insert part is integrally heat bonded with the foam base layer, stiffness of the fixed portion can be enhanced.

This invention provides a method for producing foam base material product with a securing device fixed thereto, the foam base material product having improved stiffness, higher assembly accuracy and simple operation.

EXAMPLE 1

The method for producing a foam base material product with securing device of this invention will be described with respect to FIGS. 1-4.

This example relates to the method for producing a foam base material product 3 with a securing device 10 bonded to a foam base layer 32 of composite sheet 30. The composite sheet 30 includes surface layer 31, foam layer 33, and foam base layer 32.

When producing the product, as shown in FIG. 2, an insert part 1 is formed by integrally fixing the securing device 10 with a foam beads body 2.

Figure 3:
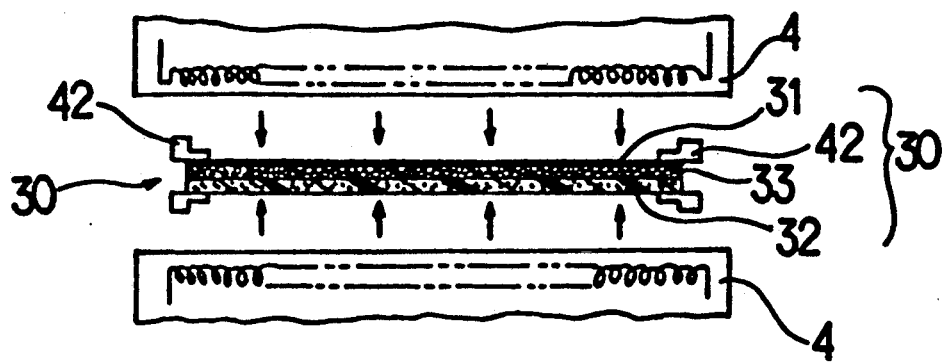

As shown in FIG. 4, the insert part 1 is placed within a mold 5 and the foam base layer 32 of hot molten composite sheet 30 is placed so as to face towards the insert part 1. The mold 5 is closed to form the composite sheet 30 as well as to heat fuse the insert part 1 to the composite sheet. Prior to being placed in the mold 5, the composite sheet 30 is preliminary heated by a heater 4 as shown in FIG. 3.

Figure 1:
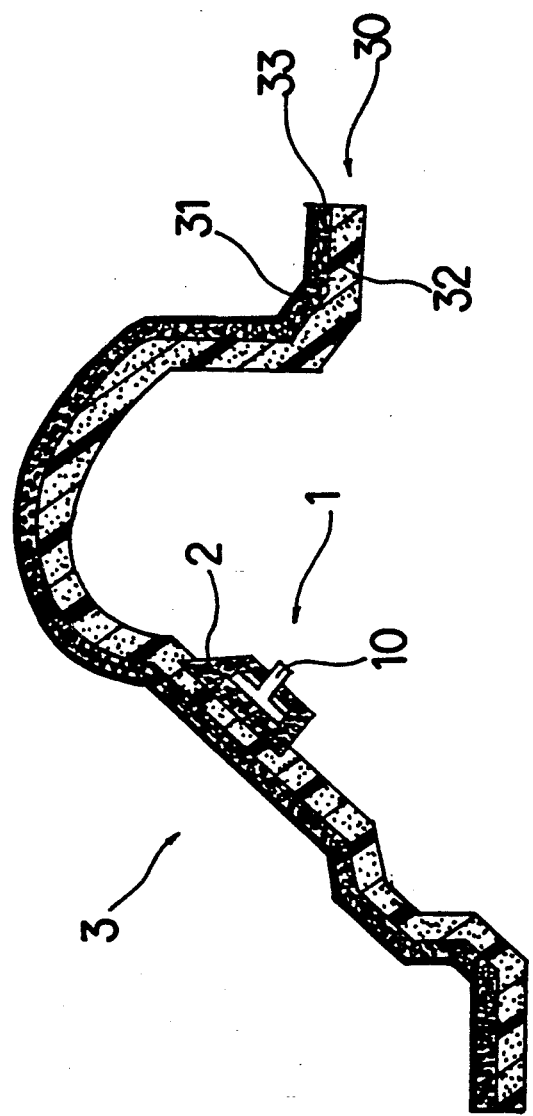
FIGS. 1-4 illustrate Example 1 of the present invention.

Thus as shown in FIG. 1, the insert part 1 is integrally heat fused with the foam base layer 32, resulting in the provision of the foam base material product 3 with improved stiffness and increased assembly accuracy.

The surface layer 31 is formed from PVC resin sheet with thickness of about 0.7 mm. The foam layer 33 is 3 mm thick and a structure derived from foaming, i.e., expanding, PP by 15-30 times its original size.

The foam base layer 32 is formed from PP resin of the foam material having a thickness of about 1-1.5 mm.

As shown in FIG. 3, both ends of the composite sheet 30 are held by respective clamp 42 so that the composite sheet is held steadily while it is heated by a heater 4. The foam base layer 32 is melted to be foamed or expanded so as to have its thickness increased by 4-10 mm.

As shown in FIG. 2, the injection molded securing device 10 is inserted into the mold to be integrally molded with the foam beads 2, thereby producing the insert part 1. The securing device 10 consists of a boss 11, a press support 12 and a rib 13 that prevents rotation. The foam beads 2 is a structure derived from heating and foaming PP beads, with an average particle size of about 1 mm, to a size about 10 times larger.

The insert part 1 is placed on a plug mold (lower mold) 52 of the mold 5 as shown in FIG. 4. The mold 5 consists of the plug mold 52 and a porous mold (upper mold) 51. The plug mold 52 is an air permeable type mold, pressurizing air from its lower side. The porous mold 51 is an air permeable type mold for vacuum molding by decreasing pressure through outside suction force. In order to have integral heat fusing of the insert part 1 and the composite sheet 30, as shown in FIG. 4, the foam base layer 32 of hot molten composite sheet 30 is placed on the plug mold 52 and the insert part 1, facing thereto. Then the mold is closed to form the composite sheet 30 therein as well as to fuse the insert part 1 with the composite sheet.

When finished molding, the mold is opened to remove the composite sheet 30, which is fused with the insert part 1.

The effect of this example will be described hereinbelow.

As aforementioned, this example uses the insert part 1 with the securing device 10 integrally fixed to the foam beads 2. Fixing the securing device 10 to the foam base layer 32, thus, needs no bond means which have been conventionally used, such as vibration deposition and adhesion.

The foam base layer 32 of the hot molten composite sheet 30 is placed facing the insert part 1. Then, the composite sheet 30 is integrally heat fused with the insert part 1, resulting in consistent positioning of the insert part 1 during assembly of the control panel and auto body.

Accordingly, accuracy of assembly of the securing device 1 to the foam base material product 3 is improved, and the operation for forming the product is simplified.

Since the insert part 1 is integrally fused with the foam base material layer 32, rigidity is enhanced.

Therefore this example provides a foam base material product with a securing device fused thereto having improved rigidity and higher accuracy during assembly as well as providing an easy manufacturing process.

EXAMPLE 2

The production method according to this invention will be described with respect to FIGS. 5 and 6.

This example uses a securing device 15, different from the securing device 10 of EXAMPLE 1. Securing device 15 includes a boss 151, an engagement protrusion 152, a rib 153 for preventing rotation, and a press support 154. In other aspects, the construction of securing device 15 is identical to that of securing device 10 in EXAMPLE 1.

The protrusion 152 is formed on the top of the boss 151. The rib 153 is formed like a plate blade, laterally elongated from the boss 151 with uniform length. The support 154 is perpendicularly attached to the boss 151, the protrusion 152 and the rib 153 to form a wall-like plate.

Figure 5:
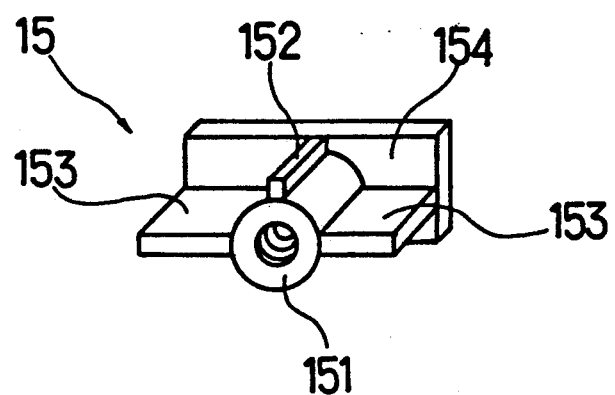
FIGS. 5 and 6 show Example 2 of this invention.

Shown in FIG. 5, the securing device 15, formed from PP resin, is formed using injection molding. The securing device 15 is inserted into the foam beads 20 of PP resin to be integrally fixed to obtain the insert part 1 as shown in FIG. 6.

Like EXAMPLE 1, the insert part 1 is placed within the mold for heat fusing as well as to be formed with the composite sheet 30. This provides the foam base material product with the securing device integrally heat fused with the foam base material layer of the composite sheet.

According to this example, the same effects as explained in EXAMPLE 1 are obtained.

EXAMPLE 3

The producing method of this example will be described with respect to FIGS. 7 and 8.

This example uses an insert part, instead of the securing device 10 of EXAMPLE 1, which is formed from the engagement of the foam beads 21 and a securing device 17. In other aspects, the construction is identical to that of EXAMPLE 1.

Shown in FIG. 7, the securing device includes a protrusion 171 with an engagement hole 172 therein and an engagement plate 173 laterally extending from each end of the base of the protrusion 171 to form L-like shapes, respectively. The securing device 17 is formed from light weight metal such as aluminum alloy.

Shown in FIG. 8, the foam beads 21 has an opening 212 with a long engagement recess 213 formed therebehind. The foam beads 21 is formed from PP resin.

The securing device 17 is engaged both with the opening 212 and the recess 213 to bond them with adhesion, resulting in the insert part with the securing device 17 being integrally fixed with the foam 21.

The molding is performed in the same way as EXAMPLE 1 to have the foam base material product with the securing device integrally heat fused with the foam base material of the composite sheet.

According to this example, the same effect as explained in Example 1 is obtained.

While the invention has been described with reference to several examples, it is to be understood that modifications or variations may be easily made by a person of ordinary skill in the art without departing from the spirit and scope of the present invention which is defined by the appended claims.

What is claimed is:

1. A method for producing a foam base material product including a composite sheet having a surface layer and a foam base layer with a securing device fixed on the foam base layer, said method comprising the steps of:
    foaming and expanding resin beads to form an insert part, said insert part being integral with said securing device;
    placing said insert part within a mold including placing said insert part in a recess formed in said mold;
    providing said foam base layer in the form of hot molten composite sheet;
    placing said foam base layer of hot molten composite sheet on said mold such that said foam base layer is facing said insert part; and
    closing said mold whereby said composite sheet is formed and said composite sheet is integrally heat fused with said insert part, thereby producing said foam base material product;
    said method being carried out using a mold including a plug mold member, which has an air permeability that allows pressurized gas into said mold during molding, and a porous mold member, which has an air permeability that allows reduced pressure within said mold during molding, said reduced pressure being applied to the surface layer of said composite sheet.

2. A method as in claim 1, wherein said surface layer of said composite sheet is synthetic resin to be selected from the group consisting of polyvinyl chloride and polypropylene.

3. A method as in claim 1, wherein said foam base layer of said composite sheet is synthetic resin selected from the group consisting of polypropylene and polyvinyl chloride.

4. A method as in claim 1, wherein said beads are synthetic resin selected from the group consisting of polypropylene and polyethylene.

5. A method as in claim 1, wherein said insert part is formed by an insert molding method in which the foamed resin beads are molded to said securing device.

6. A method as in claim 1, wherein said insert part is formed by molding the foamed resin beads and then engaging said securing device and the molded resin beads.

7. A method as in claim 1, further comprising the steps of heating said composite sheet so that said foam base material layer expands before the composite sheet is placed within said mold.

8. A method for producing a foam base material product including a composite sheet having at least a foam base layer with a securing device fixed thereto, said method comprising the steps of:
    foaming and expanding resin beads to form an insert part, said insert part being integral with said securing device;
    positioning said insert part in a recess formed in a plug mold member;
    heating said composite sheet;
    positioning said heated composite sheet on said plug mold member so that said foam base layer is disposed next to said insert part;
    placing a porous mold member next to said composite sheet and on an opposite side of said composite sheet than said plug mold member and applying pressure to said composite sheet from said porous mold member and said plug mold member; and
    heat fusing said insert part to said foam base layer due to heat generated in said placing step.

* * * * *